United States Patent [19]
Coles et al.

[11] Patent Number: 6,104,152
[45] Date of Patent: Aug. 15, 2000

[54] MOTOR DRIVE CONTROL

[75] Inventors: Jeffrey Ronald Coles, West Midlands; Russell Wilson Jones, Warwickshire; Andrew James Stephen Williams, West Midlands, all of United Kingdom

[73] Assignee: Lucas Industries Public Limited Company, United Kingdom

[21] Appl. No.: 09/356,163

[22] Filed: Jul. 16, 1999

Related U.S. Application Data

[62] Division of application No. 09/101,530, filed as application No. PCT/GB97/00052, Jan. 9, 1997.

[30] Foreign Application Priority Data

Jan. 11, 1996 [GB] United Kingdom .................. 9600549

[51] Int. Cl.$^7$ ........................................ H02P 7/06
[52] U.S. Cl. ............... 318/254; 318/568.16; 318/568.22; 364/424.05
[58] Field of Search ................... 318/254, 432, 318/568.16, 560, 568.22; 364/424.05

[56] References Cited

U.S. PATENT DOCUMENTS 5,463,300  10/1995  Oximberg ................ 318/801
5,504,403  4/1996  McLaughlin ............. 318/432
5,623,409  4/1997  Miller .................. 364/424.051

FOREIGN PATENT DOCUMENTS 0 521 709 A2  1/1993  European Pat. Off. .
0 599 260 A1  6/1994  European Pat. Off. .
2 281 459  3/1995  United Kingdom .

*Primary Examiner*—Robert E. Nappi
*Assistant Examiner*—Rita Leykin
*Attorney, Agent, or Firm*—Christensen O'Connor Johnson & Kindness PLLC

[57] ABSTRACT

A control strategy for a multiple phase brushless motor (1) is disclosed in which the top (2, 3, 4) and the bottom (5, 6, 7) switching devices in two arms of the motor bridge are driven using complementary pulse width modulated waveforms, so that the top device (2, 3, 4) in one of the arms is in the ON state whilst the bottom device (5, 6, 7) is in the OFF state and vice versa. In an alternative arrangement, the control strategy described hereinbefore is used at high motor speeds whilst at low motor speeds a conventional modulation scheme is used in which a top switching device (2, 3, 4) in one arm of the bridge is in the ON state and a bottom device (5, 6, 7) in a different arm of the bridge is pulse width modulated. In another aspect, a method of calculating the position of the motor rotor is disclosed.

6 Claims, 13 Drawing Sheets

| Hall Sensor O/P Code | | | Drive Direct$^n$ | Red Phase FETs | | Yellow Phase FETs | | Blue Phase FETs | |
|---|---|---|---|---|---|---|---|---|---|
| A | B | C | | Top | Bottom | Top | Bottom | Top | Bottom |
| 1 | 1 | 0 | FWD | OFF | OFF | OFF | PWM1 | ON | OFF |
| 1 | 0 | 0 | FWD | OFF | PWM1 | OFF | OFF | ON | OFF |
| 1 | 0 | 1 | FWD | OFF | PWM1 | ON | OFF | OFF | OFF |
| 0 | 0 | 1 | FWD | OFF | OFF | ON | OFF | OFF | PWM1 |
| 0 | 1 | 1 | FWD | ON | OFF | OFF | OFF | OFF | PWM1 |
| 0 | 1 | 0 | FWD | ON | OFF | OFF | PWM1 | OFF | OFF |
| 1 | 1 | 0 | REV | OFF | OFF | ON | OFF | OFF | PWM1 |
| 1 | 0 | 0 | REV | ON | OFF | OFF | OFF | OFF | PWM1 |
| 1 | 0 | 1 | REV | ON | OFF | OFF | PWM1 | OFF | OFF |
| 0 | 0 | 1 | REV | OFF | OFF | OFF | PWM1 | OFF | OFF |
| 0 | 1 | 1 | REV | OFF | PWM1 | OFF | OFF | ON | OFF |
| 0 | 1 | 0 | REV | OFF | PWM1 | ON | OFF | OFF | OFF |

Fig. 2

| Motor Drive Direct'n | Initial Hall Sensor Code | | | | Final Hall Sensor Code | | |
|---|---|---|---|---|---|---|---|
| | A | B | C | | A | B | C |
| FWD | 1 | 0 | 0 | ⇑ | 1 | 0 | 1 |
| FWD | 1 | 0 | 1 | ⇑ | 1 | 0 | 0 |
| FWD | 0 | 0 | 1 | ⇑ | 0 | 1 | 1 |
| FWD | 0 | 1 | 1 | ⇑ | 0 | 1 | 0 |
| FWD | 0 | 1 | 0 | ⇑ | 1 | 1 | 0 |
| FWD | 1 | 1 | 0 | ⇑ | 1 | 0 | 0 |
| REV | 1 | 0 | 0 | ⇑ | 0 | 1 | 0 |
| REV | 1 | 0 | 1 | ⇑ | 1 | 0 | 0 |
| REV | 1 | 1 | 1 | ⇑ | 1 | 1 | 1 |
| REV | 0 | 0 | 1 | ⇑ | 0 | 1 | 1 |
| REV | 0 | 1 | 1 | ⇑ | 1 | 1 | 0 |
| REV | 0 | 1 | 0 | ⇑ | 0 | 1 | 1 |

Fig. 6

| Motor Drive Direct$^n$ | Initial Hall Sensor Code | | | | Final Hall Sensor Code | | |
|---|---|---|---|---|---|---|---|
| | A | B | C | | A | B | C |
| FWD | 1 | 1 | 0 | ⇑ | 1 | 0 | 0 |
| FWD | 1 | 0 | 0 | ⇑ | 1 | 1 | 0 |
| FWD | 1 | 0 | 1 | ⇑ | 0 | 0 | 1 |
| FWD | 0 | 0 | 1 | ⇑ | 1 | 0 | 1 |
| FWD | 0 | 1 | 1 | ⇑ | 0 | 0 | 1 |
| FWD | 0 | 1 | 0 | ⇑ | 0 | 1 | 1 |
| REV | 1 | 0 | 0 | ⇑ | 1 | 0 | 1 |
| REV | 1 | 0 | 1 | ⇑ | 0 | 0 | 1 |
| REV | 0 | 0 | 1 | ⇑ | 0 | 1 | 1 |
| REV | 0 | 1 | 1 | ⇑ | 1 | 1 | 1 |
| REV | 0 | 1 | 0 | ⇑ | 1 | 0 | 0 |
| REV | 1 | 1 | 0 | ⇑ | 0 | 1 | 0 |

Fig. 7

MOTOR DRIVE CONTROL

This application is a divisional of U.S. application Ser. No. 09/101,530, filed Jul. 9, 1998, which was the National Stage of International Application Ser. No. PCT/GB97/00052, filed Jan. 9, 1997, the benefit of the filing date of which is hereby claimed under 35 U.S.C. § 120, which in turn claims the benefit of British application No. 9600549.1, filed Jan. 11, 1996, the benefit of the filing date of which is hereby claimed under 35 U.S.C. § 119.

This invention relates to improvements in electrical motor control strategies, especially but not exclusively for use in an electrical power steering system.

It is known in the art to provide an electrical power steering system for vehicles in which an electrical motor replaces the traditional hydraulic assistance, so as to produce a compact, efficient steering system. Steering assistance is provided by driving the motor in response to a measure of the torque in the steering column. In such an application, it is essential to have good control of the output characteristics of the motor, i.e. the motor torque.

A typical motor and drive circuitry of the kind to which this invention relates, and which may be used in a power steering system, comprises three elements; a multiple phase permanent magnet brushless motor in which the phases are connected in a star fashion, a multiple phase bridge, each arm of the bridge comprising a top switching means and a bottom switching means; and sensing means for detecting rotor position and/or motor current. The top and bottom switching means typically each comprise a single transistor or two or more transistors connected in parallel.

The control strategy controls the modulation technique used to drive the transistors, thereby controlling the current in the motor windings together with knowledge of rotor position and hence controlling the motor torque.

Traditionally, such a motor system is driven by a dedicated integrated circuit which performs the function of the control strategy, for example the Motorola MC33035 integrated circuit (IC). This provides all the features necessary to implement a motor control strategy for a 3 or 4 phase motor. The IC provides 3 outputs for driving the top transistors, and 3 outputs for driving the bottom transistors in each arm. For any given rotor position, the IC is used to enable only one top and one bottom transistor of the drive circuitry. An additional feature of this type of motor control is that the enabled top and bottom transistors are on different arms of the bridge.

In the enabled state, the bottom transistor only is pulse width modulated, with the enabled top transistor being in the ON state for the whole modulation period. Varying the pulse width modulation duty of the bottom transistor determines the motor voltage and can be used to control motor current level and speed. The selection of the desired top and bottom transistor is performed under the IC's simple control strategy which interprets the data from a position sensor in conjunction with measurements of the current flowing in the motor windings. This type of modulation will be referred to as bottom only modulation, because only the bottom transistors are pulse width modulated.

A disadvantage of the conventional commutation including the bottom control as described above is that in open loop voltage control mode, a transient drop in overall resultant motor current level (and hence torque) occurs upon commutation from one phase to the next. In the power steering application set forth, these transients are felt by the driver through the steering wheel. Other problems arise when the motor is changing direction, due to poor current control using bottom-only modulation when the motor decelerates.

An aim of the present invention is to provide an improved motor control strategy which provides accurate control of motor torque irrespective of rotor speed and position, to minimise motor torque ripple and to minimise acoustic noise from the motor.

According to a first aspect of the invention, in a control strategy for controlling the pulse width modulation of a multiple phase brushless motor having at least three phases in which each phase of the motor is connected to an arm of a multi-phase bridge and each arm of the bridge comprises a top switching device and a bottom switching device, said switching devices comprising at least one transistor, said control strategy is characterised by comprising driving the switching means with a first modulation mode in which complementary pulse width modulated inputs are applied to the top and bottom switching devices in two arms of the bridge so that in each of said two arms the top switching device is in the ON state whilst the bottom device is on the OFF state, and at the end of the pulse width modulation duty cycle the state of the two switching devices is reversed, selection of said pulse width modulation duty cycle and which switching devices are modulated being performed by a control algorithm in response to the output of a sensing means.

In this control strategy, the pulse width modulated inputs applied to the top and bottom transistors in a given arm of the bridge are complementary to one another, i.e. during a single modulation period, one transistor is ON whilst the other transistor is in the OFF state, and at the end of the pulse width modulation duty within the modulation period, the state of the two transistors is reversed. The average voltage applied to the motor is then determined by the ratio of the ON times of the two transistors. The state of the two transistors therefore swaps during each modulation period.

This modulation technique will be known as complementary modulation, as the transistors in each arm of the bridge are energised as the complement of each other. The direction of the applied motor voltage is reversed on each PWM cycle. Zero net motor voltage is applied at 50% PWM duty when forward voltage is applied for the same time as reverse voltage, and there is no discontinuity of the bridge operation upon reversal of net applied motor voltage. In this manner, control difficulties experienced in the bottom only modulation technique are eliminated, and smooth reversals of the steering wheel can be achieved when used in an EPAS system. Also, by using complementary mode switching the commutation transients are symmetrical for both positive and negative half cycles of motor current, whereas this is not true in the case of lower or bottom-only control.

Preferably, an interlock delay can also be provided if this feature is not provided in the driver IC for each transistor.

The addition of an interlock delay prevents "shoot-through". Shoot-through occurs when a top and bottom transistor in the same leg of the bridge are both turned on. MOS-FET and other transistors take a finite time to turn on and off so the interlock delay can be used to delay turning on of the bottom transistor after turning off the top transistor (or vice versa).

Preferably, the sensing means may comprise a current sensor for detecting the current flowing in the motor, and an angular position sensor for detecting the rotor position of the motor rotor, the outputs of both sensors being employed by the control algorithm.

In this case, the motor current is controlled by reading the current sensors, processing the measured values in accordance with the output of the position sensors to provide a 'motor current' value, applying an appropriate feedback control algorithm that compares this 'motor current' to a demanded value in software, and adjusting the PWM duty in accordance with the output from the control algorithm. The PWM duty is applied to the appropriate transistors of the bridge according to the output of the angular position sensors.

Preferably, the motor may comprise a 3-phase motor and a 3-phase bridge will then be used.

Hall effect devices can be used as the position sensors, and may be arranged in a manner that enables the output of the hall sensors to be expressed as a 3-bit digital code. This digital code can then be employed by the control strategy when determining which transistors will be pulse width modulated.

In the complementary PWM mode, just two of the motor phases may be energised at any given rotor position except for commutation transients when all 3 phases conduct for a short period, typically the same two phases as would be used in the bottom only modulation technique. In this way, it is not necessary to use costly high resolution position sensors.

Whilst the above modulation scheme offers a considerable improvement over the bottom only modulation technique during motor reversals, a disadvantage of the complementary scheme is that it generates a higher ripple current in the bridge filter capacitor.

Therefore, according to a second aspect of the invention, we provide a control strategy for controlling the pulse width modulation of a multiple phase brushless motor having three phases in which each phase of the motor is connected to an arm of a multi-phase bridge and each arm of the bridge comprises a top switching device and a bottom switching device, said switching devices comprising at least one transistor, characterised in that said control strategy selects from a first modulation mode and a second modulation mode:
whereby in said first modulation mode, the top switching device and the bottom switching device in at least one arm of the bridge are driven by complementary pulse width modulated inputs applied to the top and bottom switching devices so that one of the said top or bottom switching devices is in the ON state whilst the other one of the top or bottom switching device is in the OFF state, and at the end of the pulse width modulation duty cycle, the state of the two switching devices is reversed;
and whereby in said second modulation mode, a pulse width modulated input is applied to a bottom switching device in one of said arms of said bridge whilst a top switching device in a different one of said arms of said bridge is switched ON, selection of the pulse width modulation duty cycle and which switching devices are modulated being performed by a control algorithm.

Preferably, the control algorithm employs the information from the sensing means to determine the most suitable modulation technique.

Preferably, complementary modulation is used at low motor speeds to give good control of motor reversals, and bottom only PWM is used at high motor currents to minimise the ripple current in the bridge filter capacitor. The control algorithm may switch motor drive from one mode to the other at a motor current of approximately half the maximum motor current.

The current flowing in ground return from the bridge and in each of the motor phases and/or the individual phase legs can be sensed by means of the potential drop across a series resistor in these paths.

A third aspect of the invention is the implementation of a soft commutation mode or a hard commutation mode when either complementary modulation or the bottom only modulation is selected by the control algorithm.

In a soft commutation mode, the rate of the decrease of the terminating phase current is decreased to match the rate of increase of the commencing phase current. This offers the advantage of maintaining the current in the third phase at a constant level without the undesirable current transient that otherwise occurs due to inductive effects. The reduced rate of change at the commutation point reduces the magnitude of the induced EMF's in the motor phases and also reduces acoustic noise.

Preferably, the duration of the soft commutation is controlled by the control algorithm in response to motor current and rotor position so as to optimise performance at low rotor speed and to minimise the drop in motor torque at high rotor speed.

Alternatively, hard commutation may be employed. In this case, the rate of increase of the commencing phase current is increased to match the rate of decrease of the terminating phase current to maintain a constant current in the third phase, and again overcoming the undesirable momentary drop in current (and hence torque) that otherwise occurs. The duration of such a hard commutation may be controlled by the control algorithm or in software.

A second aim of the present invention is to provide a means for determining the absolute position of the rotor of the motor, enabling further improvements in detection and control of the commutation event.

According to a fourth aspect of the invention, a method of calculating the position at a moment in time of a motor which is connected to an output shaft through an intermediate means comprises the steps of:

obtaining a first measurement of actual rotor position at a first instance in time using sensing means provided at the motor;
calculating speed of rotation of said output shaft using a sensing means provided on said output shaft;
calculating an offset indicative of the displacement of the rotor of the motor between the first instance of time and said moment in time based upon the speed of rotation of the output shaft, and;
modifying the first measurement of rotor position obtained at the first instance by adding the offset to produce an output indicative of absolute motor rotor position at said moment in time.

Preferably the motor position sensing means comprises a high precision absolute motor position sensor.

Alternatively the motor position sensing means comprises a combination of position measurements from sensing means on the output shaft with the output of position sensors on the motor.

Alternatively the motor position sensing means comprises a combination of absolute position sensor on the output shaft with an incremental position sensor on the rotor of the motor.

Preferably, the motor position sensor may comprise Hall effect sensors, which may produce a 3-bit digital code. In the case of an electrical power steering system, for example, the intermediary means may comprise a clutch and/or a gearbox, and the motor may drive the output shaft through a worm and worm wheel.

The position of the output shaft, which in the case of an electrical power steering system would be the steering column, can be obtained from a dedicated position sensor or from a suitable output from a torque sensor, such as the Lucas Linear Array Torque sensor.

The rotor position sensors, i.e. Hall effect sensors, provide an absolute indication of motor electrical angle. Whenever a Hall sensor changes state, an offset is set to zero. On every periodic sample, the output shaft velocity can be determined from the output shaft position sensor. This may be done by comparing the last two shaft position measurements. The gearbox ratio may be multiplied by the shaft velocity and added to this offset. The Hall effect state plus the offset enables high resolution absolute position information to be determined.

In this manner, by resetting the offset on every Hall sensor transition the effects of backlash and torsional wind-up is minimised, and so that the position information on the output shaft can be used to indicate the position of the motor rotor.

According to a further aspect of the present invention, absolute angular position information can be used to optimise the motor commutation position under different motor operating conditions.

The commutation position may be varied by advancing or retarding the position at which a commutation event occurs, in response to the absolute motor position readings. This minimises the torque step that can occur at the commutation point, due to changes in the magnetic effects in the motor as current levels increase. The commutation point can also be varied as a function of the motor speed to provide higher torque at higher motor speeds, thus improving the steady state torque/speed envelope of the motor for a given battery voltage.

The demanded current may also be controlled in order to minimise predictable on-load motor torque ripple by adjusting the current in response to motor current, motor velocity and absolute position information.

Some embodiments of our invention are illustrated in the accompanying drawings in which:

FIG. 2 shows the bottom only modulation technique used and the current state of each transistor for a given Hall sensor and code;

FIG. 6 shows the Hall sensor code changes which result in top commutation;

FIG. 7 shows the Hall sensor code changes which results in bottom commutation;

Figure 14:
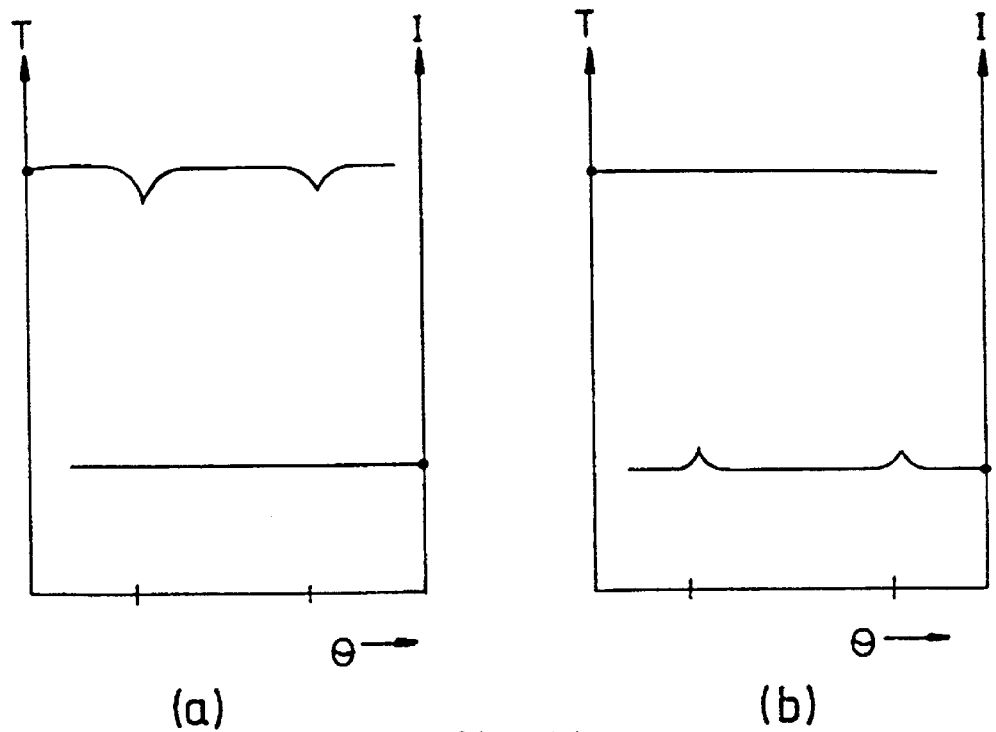
Figure 15:
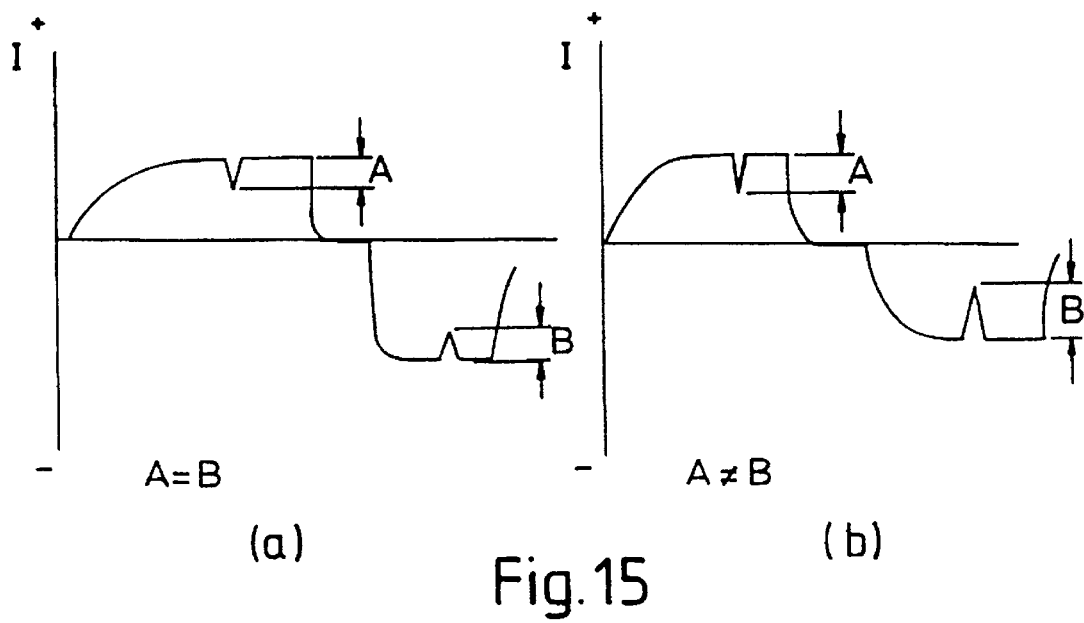

FIGS. 14 (a) and (b) illustrates the use of current shaping by applying a boost voltage to minimise position dependent ripple; and FIG. 15 shows the relationship between the transient dip in current in the positive A and negative B cycles for (a) the complementary and (b) bottom only modulation schemes.

It is well known that the instantaneous torque in a permanent magnet excited electric motor can be controlled so that it is substantially proportional to the instantaneous motor current in the excited phases. Hence, controlling the motor current also controls the motor torque. Since it is cheaper to measure motor current than to directly measure motor torque, a current control system is implemented.

Figure 1A:
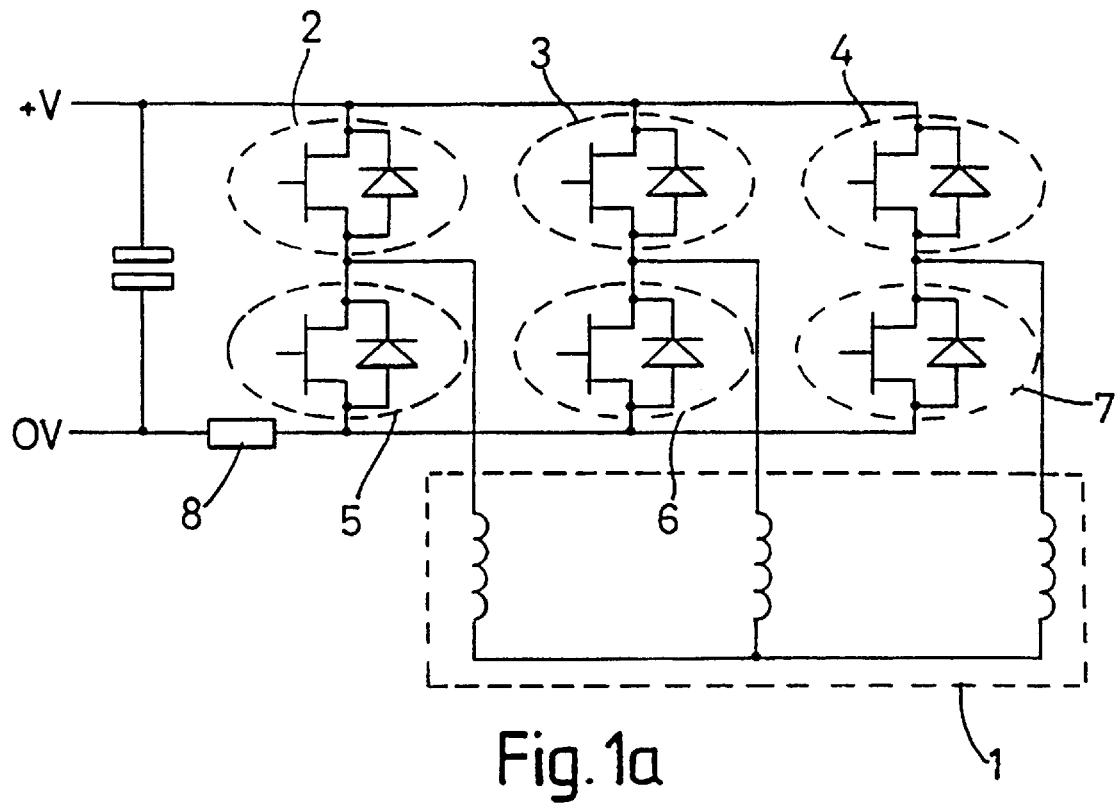
FIGS. 1a and 1b show a 3-phase brushless DC motor and associated power drive circuitry which comprises a 3-phase bridge.

A specific embodiment of a motor and power drive circuitry is shown in FIG. 1. The motor (1) shown is a three-phase brushless DC motor, the phases of the motor being connected together in a star configuration. The drive circuitry comprises a three phase bridge. Each arm of the bridge further comprises a pair of transistors connected in series between a supply rail and a ground, with the motor windings being tapped off from between the two transistors. MOS-FET type transistors are used. The transistors in each arm are referred to in this text as top transistors (2,3,4) and bottom transistors (5,6,7) respectively.

This type of motor and drive circuit is often controlled using a dedicated IC such as Motorola MC 33035 that switches one top field effect transistor (FET) fully on, and applies a pulse-width modulated (PWM) control signal to one bottom FET. The particular FETs are determined by the IC which decodes information from an angular position sensor in conjunction with current information.

In one example, the angular position of the motor rotor is sensed through use of magnetic effect sensors placed so as to detect the passing of an overhang section of the rotor magnets wherein the sensor is arranged to have a magnetic shield that provides a magnetic path for the sensor circuit itself whilst shielding the sensor from the effects from any external magnetic fields.

In operation the sensing element switches each time a magnetic circuit is made or broken which occurs as a pole of the motor or rotor magnet 27 passes a sensing element. This switching signal is passed via connections, not shown, to the motor control circuit.

The rotor carries a back iron sleeve 26 having magnets 27 secured around its periphery covered by a rotor sleeve 28. A clearance or air gap 29 is provided to allow the rotor to move angularly with respect to the sensor assembly 30 and motor stator (not shown).

Figure 12:
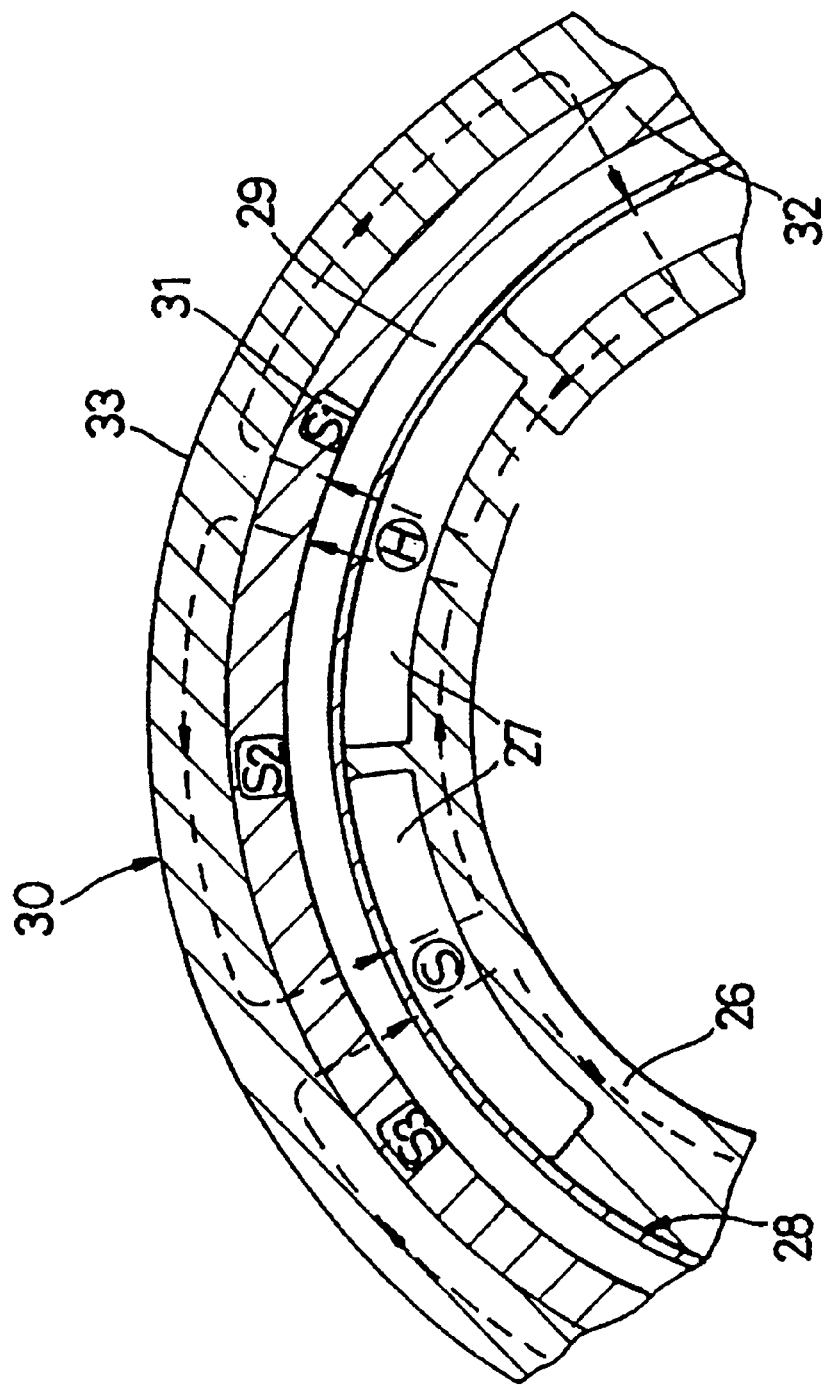
FIG. 12 illustrates the relationship between Hall effect sensors and the motor armature such that rotor position information can be obtained.

The sensor assembly shown in FIG. 12 is a three element device surrounding an arc or outer section of the rotor. The size and number of elements 31 within the sensor assembly may vary between 1 and any number covering the entire circumference of the rotor, depending upon the configuration i.e. the number of rotor pole pieces of the motor.

The sensor assembly comprises a non-magnetic sensor carrier 32 in which are placed the magnetic sensing elements 31. This is surrounded by a magnetic sensor back iron 33 which acts to enhance the magnetic field strength around the sensing elements to aid switching and eliminate magnetic interference, and importantly to provide the sensor assembly with its mechanical robustness, as typically the materials from which a suitable non-magnetic sensor carrier would be made are low in mechanical strength.

The output signal from the Hall-effect sensing means can be adapted to provide a 3-bit digital code. The need for the 3-bit code is optional, and used in the preferred embodiments disclosed in this application by way of example only. At least one or more sensors providing one or more bits of position information could be used subject to the design and performance and fault tolerance constraints imposed on the actual working application.

Information about the motor current is obtained by measuring the current flowing in ground return from the bridge and/or in each of the 3 motor phases.

Figure 1B:
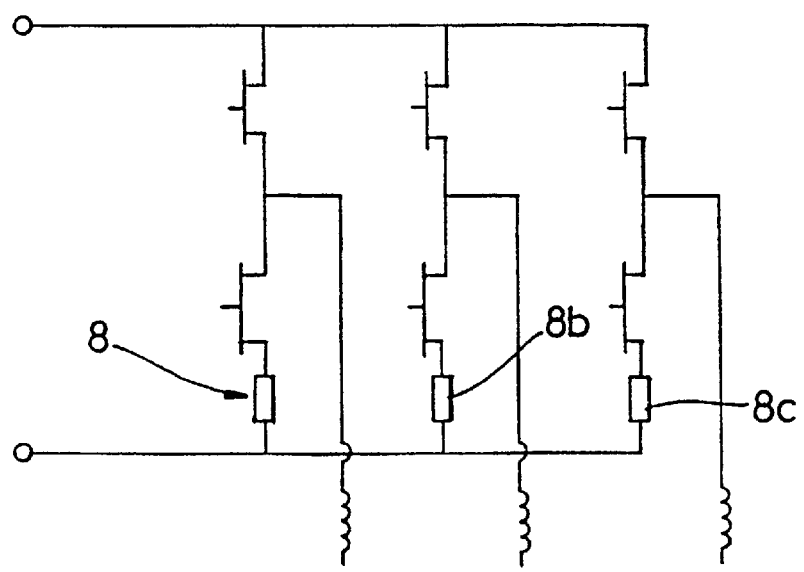

In FIG. 1b, only a single sensing resistor 8 is shown. Measuring the current flowing in the resistor can be performed by way of measuring the potential drop across the resistor and applying Ohm's Law. This single resistor provides information on the current flowing in ground return from the motor.

Alternatively, a resistor 8a,8b,8c can be provided for each arm of the bridge as shown in FIG. 1b. This allows the current in each phase to be measured, i.e. phase leg sensing.

Both the current and position information can be used by the control strategy as below.

The motor current is controlled by reading the current sensors, processing the measured values in accordance with the 3-bit digital code from the Hall-effect sensors to provide a motor current value, applying an appropriate feedback control algorithm that compares this "motor current" to a demanded value in software, and adjusting the PWM duty in accordance with the output from the control algorithm. The PWM duty is applied to the appropriate transistors of the 3-phase bridge according to the 3-bit digital code from the Hall effect sensors. This method of motor control is advantageous as it requires fewer components than electronic hardware, assuming that the microprocessor is already present.

One form of motor modulation technique which can be used with the above control strategy is known as bottom-only PWM modulation, as in all motor control circumstances only the bottom transistors 5,6,7 are pulse width modulated, whilst the top transistors 2,3,4 are either in the ON state or the OFF state, as determined by the control strategy. FIG. 2 shows a bottom-only modulation scheme showing the state of the transistors in each arm of the bridge for a given Hall effect switch code. It can be seen that in this modulation technique, only a single modulation channel, PWM1, is required.

A disadvantage of the above control strategy, in which conventional commutation is employed, is that there is a transient drop in the motor current (and hence torque) in the uncommutated phase upon commutation of the other two phases. This originates from attempting to enforce fast changes of current in the inductive windings of the motor. This transient drop in motor torque, which occurs upon commutation, can be felt and heard at the steering wheel when the motor is operating in an EPAS system.

A further disadvantage of the bottom-only PWM technique is that it provides poor control of current when the motor is reversed. The most important reversal is one in which the motor current sign is changed so that instead of putting mechanical power into the steering system, the motor is taking mechanical power out of the steering system (that is, braking the movement of the output shaft). Under such reversals, it is difficult to accurately control the motor current with bottom-only PWM.

This is because the bridge has a non-linear response under such a reversal. When the motor is braking, regenerative currents are generated in the motor windings. With bottom-only switching, these regenerative currents can only flow when the bridge is reversed (i.e. when the top transistors are switched). Thus when the bridge is reversed, the regenerative current starts to flow very suddenly causing a sharp change in motor current (and hence motor torque). Such a sharp change in torque is undesirable.

In an EPAS system it is essential to have good current control under motor reversal and the motor current is often reversed with the motor moving (and hence braking).

Figure 3:
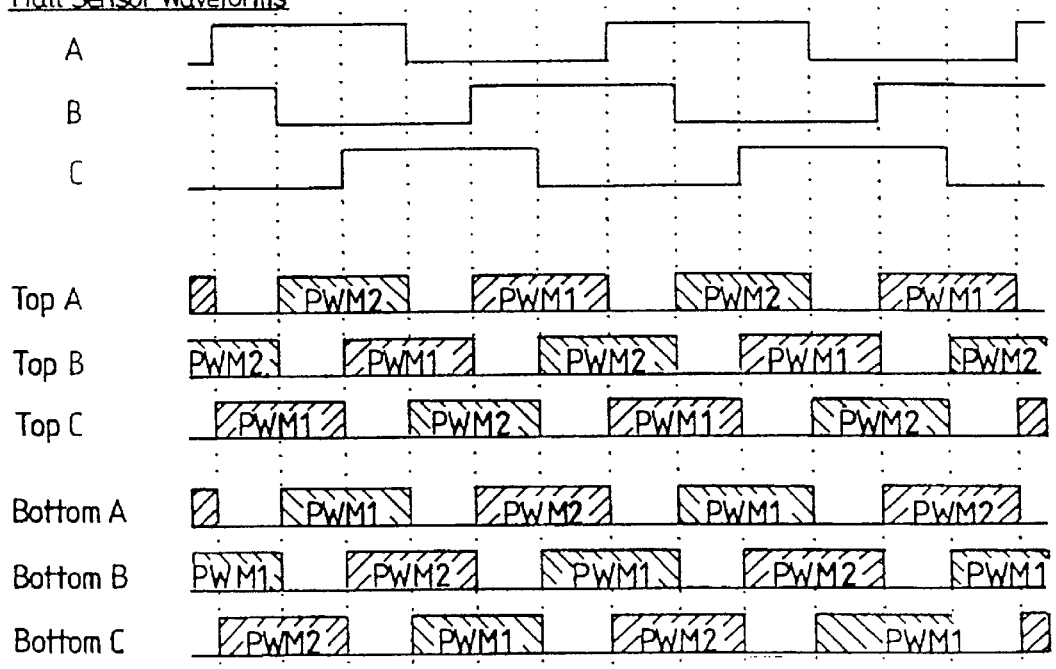
FIG. 3 illustrates the complementary PWM strategy according to a first aspect of the invention.

FIG. 3 provides details of an example of an alternative PWM mode known as complementary PWM mode which forms a first aspect of this invention. It is known as complementary PWM because the transistors are pulse width modulated as the complement of each other using complementary PWM signals. In this modulation scheme, the direction of the applied motor voltage is reversed every PWM cycle. It can be seen, therefore, that the transistors are energised as a complement to each other, and both the top and bottom transistors can be modulated. It can be seen that two PWM channels, PWM1 and PWM2 are needed.

Figure 4:
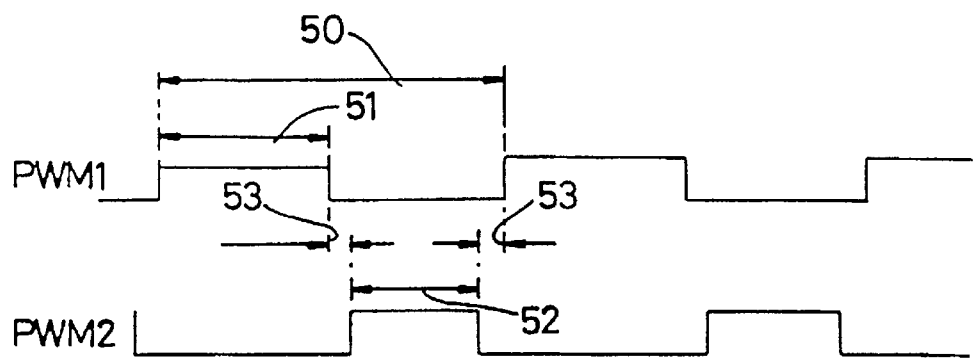
FIG. 4 illustrates the two PWM1 and PWM2 signals.

The two PWM channels have detail characterising features as shown in FIG. 4. PWM-PERIOD 50 is the total time of one modulation cycle. PWM1-HIGH-TIME 51 is the duty time that PWM1 is high (i.e. transistor turned 'ON') and PWM2-HIGH-TIME 52 is the time that PWM2 is high (i.e. transistor turned 'ON'). In normal complimentary operation, the two channels are complimentary and only one transistor is on at a time, the transistors swapping over every during each modulation period. An INTERLOCK delay 53 is also provided to prevent shoot through.

In operation, zero net motor voltage is applied at 50% PWM duty when forward voltage is applied for the same time as reverse voltage. Thus, in this mode there is no discontinuity of bridge operation upon reversal of net applied motor voltage and hence no torque transient is generated. This results in smooth reversals of the steering wheel.

A similar PWM, mode is commonly employed in AC brushless drives, where a 'flux' vector is established by energising all three motor phases to a different degree. However, this requires a high resolution position sensor which is costly. In the complementary PWM technique, only two phases are energised at a given rotor position, and so low resolution position information, such as the 3-bit code generated by the Hall sensors, can be employed.

The complementary PWM technique offers the advantage that the transients which occur during bottom only modulation are eliminated. However, a disadvantage of the complementary modulation technique is that it generates higher ripple current in the drive circuit than the bottom only modulation.

Figure 5:
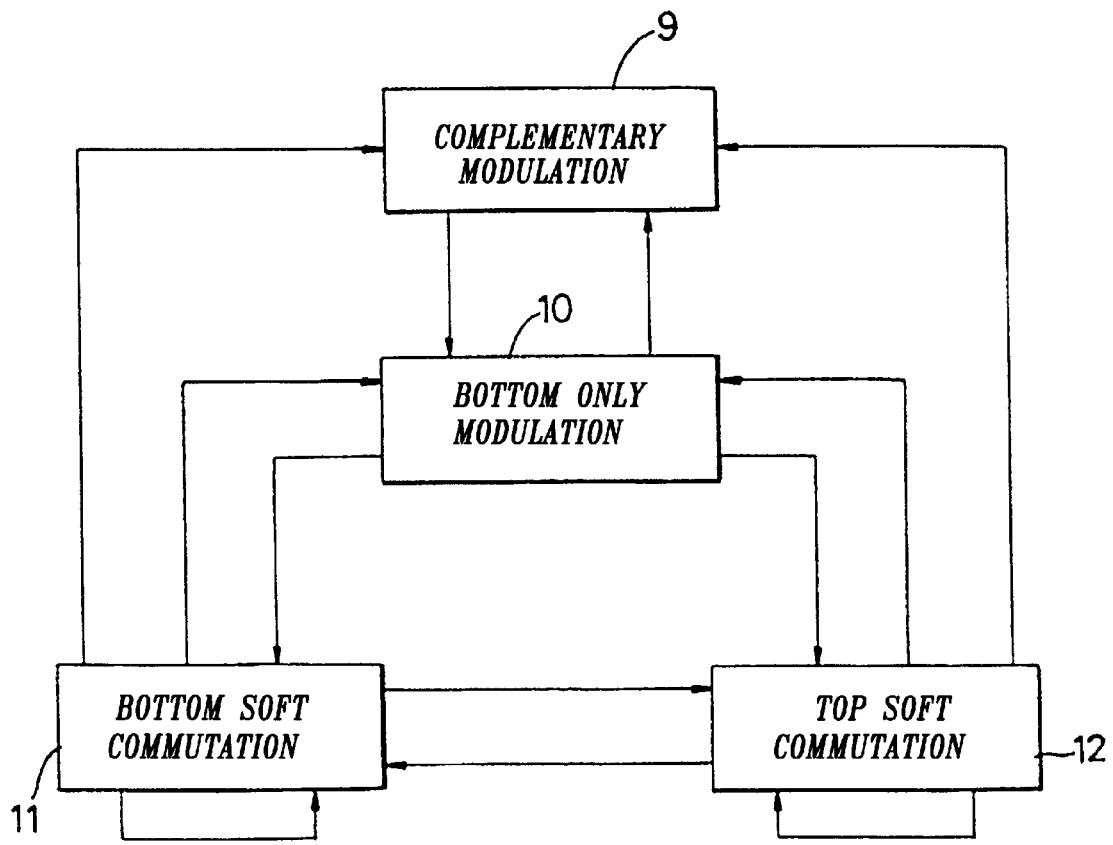
FIG. 5 illustrates a comprehensive control strategy which employs complementary and bottom only modulation according to the second aspect of the present invention.

In view of the disadvantages and advantages between the two PWM modes, the control strategy shown in FIG. 5 employs a combination of bottom only modulation and complementary modulation. Complementary modulation is selected for currents of low value either side of zero (e.g. ±10 amps) to give smooth control of motor reversals. Bottom only modulation is then switched in by the control strategy for higher currents to minimise current ripple in the drive stage. Switching between the two is performed by the control algorithm in connection with the current sensing means. This dual modulation control strategy forms the second aspect of the invention.

Figure 13:
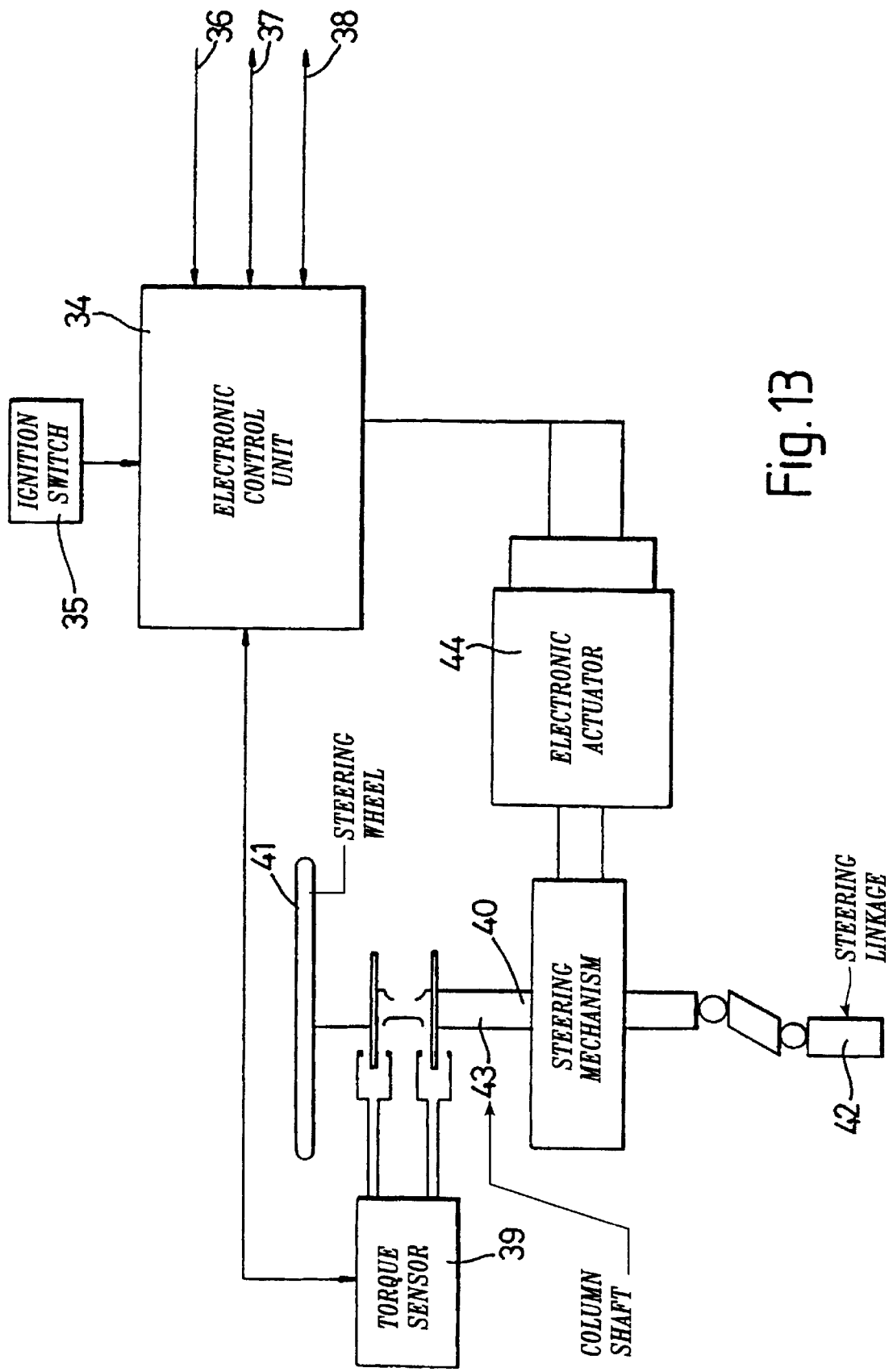
FIG. 13 illustrates schematically an electrical power steering system which embodies the control strategy of FIG. 5.

FIG. 13 illustrates an electrical power steering system which incorporates a motor control strategy of the kind illustrated in FIG. 5. An electronic control unit 34 is adapted to receive signals from an ignition switch 35, vehicle speed signalling means 36 diagnostic means 37, CAN interface means 38, and torque sensor electronic means 39. The electronic control unit 34 operates on the various signals and emits an energising current to control the power assistance applied to a steering mechanism 40.

As illustrated a steering wheel 41 controls the operation of a steering linkage 42 through a column shaft 43. The torque applied to the column shaft 43 is augmented by an electric actuator 44 under the control of the energising current from the electronic control unit 34.

FIG. 5 illustrates various logical means, in software terms, that would be embodied within the controller shown in FIG. 13. In this control strategy, both complementary 9 and bottom only 10 modulation are employed.

Complementary modulation is used at low motor currents, typically up to half the maximum motor current. If the output from the current sensing means shows that the current exceeds a pre-set value, bottom only modulation is employed. The control strategy will switch modulation back to complementary modulation if the current falls back below this pre-set value.

The control strategy when bottom only modulation is selected, employs either bottom soft commutation 11 or top soft commutation 12. Selection of the correct commutation strategy is performed in response to whether a bottom commutation or a top commutation occurs. On completion of either the top or bottom commutation event, the control strategy returns to normal bottom only modulation 10.

The control strategy can also switch directly back to complementary modulation from either the bottom soft commutation 11 or top soft commutation 12.

In bottom-only modulation, two types of commutation event can occur. A top commutation occurs when the Hall sensors change state resulting in one top FET turning off and a different top FET turning on. The Hall sensor code changes when this form of the commutation occur as shown in FIG. 6.

A bottom commutation occurs when one bottom FET is turning off and a different bottom FET is turning on. The Hall sensor code changes when this form of commutation occurs are shown in FIG. 7.

In order to understand the purpose of the two forms of soft commutation, the behaviour of the motor under a normal commutation must be appreciated. The commutation event consists of terminating the current flow in one motor phase, commencing an equivalent current flow in a second motor phase and maintaining a nominally constant current in a third motor phase. Since the three motor phases are connected in a star configuration to a star point, the sum of the currents flowing in the three phases must remain at zero. However, the rate of increase of the commencing phase current is less than the rate of decrease of the terminating phase current, and so the third (normally constant) phase current drops momentarily, whilst maintaining a value that makes the sum of the three phase currents equal to zero. This drop corresponds to a transient drop in motor torque.

One solution is to increase the rate of increase of the commencing phase current so as to match the rate of decrease of the decreasing phase current to maintain a constant third phase current and hence a constant motor torque. This is referred to as hard commutation.

This hard commutation effectively uses a 'voltage boost' feature whereby the PWM duty is increased for a short period while commutation transients are present. In bottom only mode the current transient dip in the uncommutated phase are not symmetrical for both positive and negative directions of current in the phase. This is shown in FIG. 15. Therefore a different level of voltage boost is required to minimise the current dip depending on the direction of current. In complementary mode the dip in the uncommutated phase in the same for both directions of current flow and therefore only one level of voltage boost is needed for a given current level in either direction.

Another solution is to seek to decrease the rate of decrease of the terminating phase current to match the rate of increase of the commencing phase current. When the two are matched, the resulting current in the third phase remains constant during the commutation event and hence the motor torque also remains constant. This solution is referred to as soft commutation.

Figure 8:
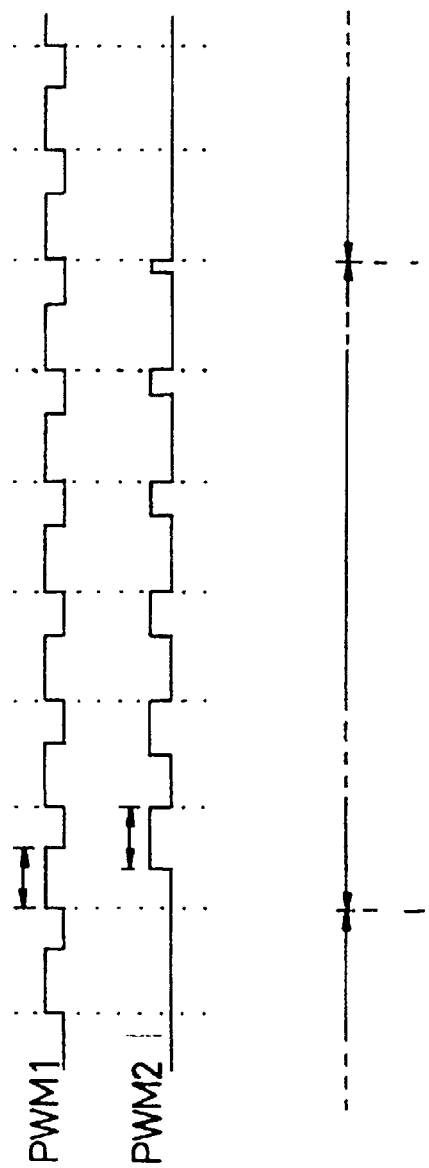
FIG. 8 shows an example of the bottom soft commutation strategy.
Figure 10:
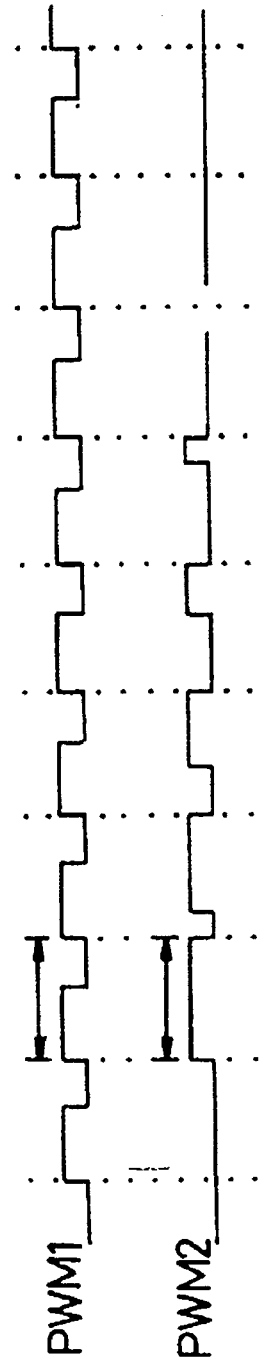
FIG. 10 shows an example of the top soft commutation strategy.

FIGS. 8 and 10 show the control strategy employed in order to effect bottom soft and top soft commutation in response to the Hall sensor output code changes during bottom only modulation.

In a refinement of the bottom soft and bottom hard commutation techniques, the duration of the commutation, i.e. the number of PWM cycles over which the commutation is effected, is adjusted under software control. This allows the commutation function to be optimised at low rotor speeds and minimises the drop in motor torque at high rotor speeds. This is illustrated in FIGS. 8 to 11 for the case of soft commutation.

The soft and hard commutation techniques can be implemented by varying the pulse width modulation period PWM2-HIGH-TIME. In the case of bottom soft and top soft commutation, the value of PWM2-HIGH-TIME can be varied according to the control strategy in response to motor torque and velocity.

Figure 9:
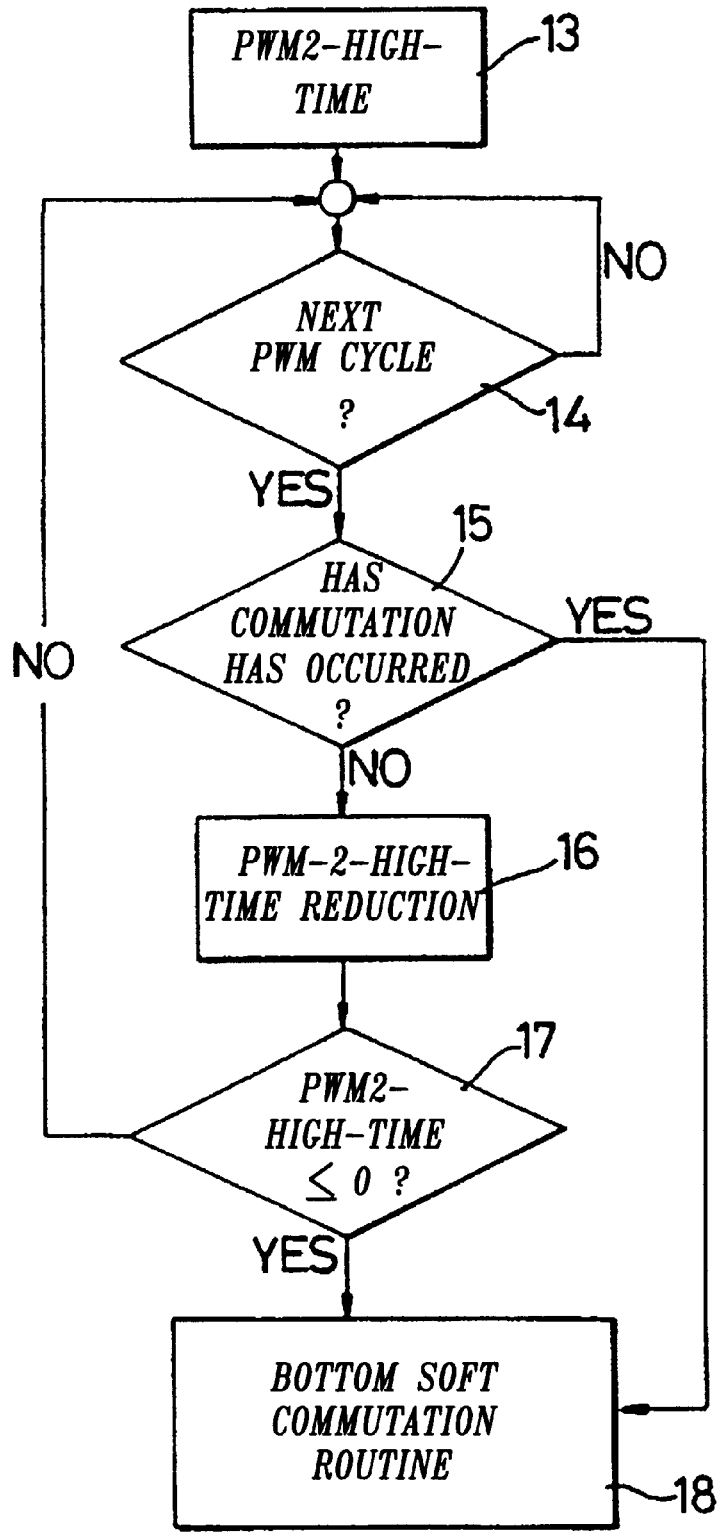
FIG. 9 shows an example of a control routine for implementing bottom soft commutation.

An example of the implementation of bottom soft modulation in this manner is shown in FIGS. 8 and 9. On entry to the bottom soft modulation state, PWM2-HIGH-TIME is initialised to the same value as PWM1-HIGH-TIME. It is then progressively reduced to zero over a predetermined number of PWM cycles. The number of PWM cycles is thus determined by the control unit according to the motor operating conditions.

In the example provided in FIG. 9, the control strategy bottom soft commutation sub routine determines the number of PWM cycles over which PWM2-HIGH-TIME is reduced as follows. After initialising PWM2-HIGH-TIME 13, the control strategy checks to see if the next PWM cycle has been reached 14. When the next cycle is reached, the control strategy moves onto the next step which is to determine whether or not a commutation has occurred 15. If a commutation has occurred, the bottom soft commutation routine is exited 18. If commutation has not occurred, however, PWM2-HIGH-TIME is reduced 16 by an amount which is dependent upon the motor torque and the motor velocity. If, after this reduction, PWM2-HIGH-TIME is less than or equal to zero 17, the bottom soft commutation mode is exited. If PWM2-HIGH-TIME is still greater than zero, the routine returns to check whether the next PWM cycle has been reached 14. This is repeated until PWM2-HIGH-TIME is equal to or less than zero and bottom soft commutation is exited.

The bottom soft commutation state is exited normally when PWM2-HIGH-TIME reaches zero, and the rising edge of PWM1 and the falling edge of PWM2 remains synchronised at all times.

Figure 11:
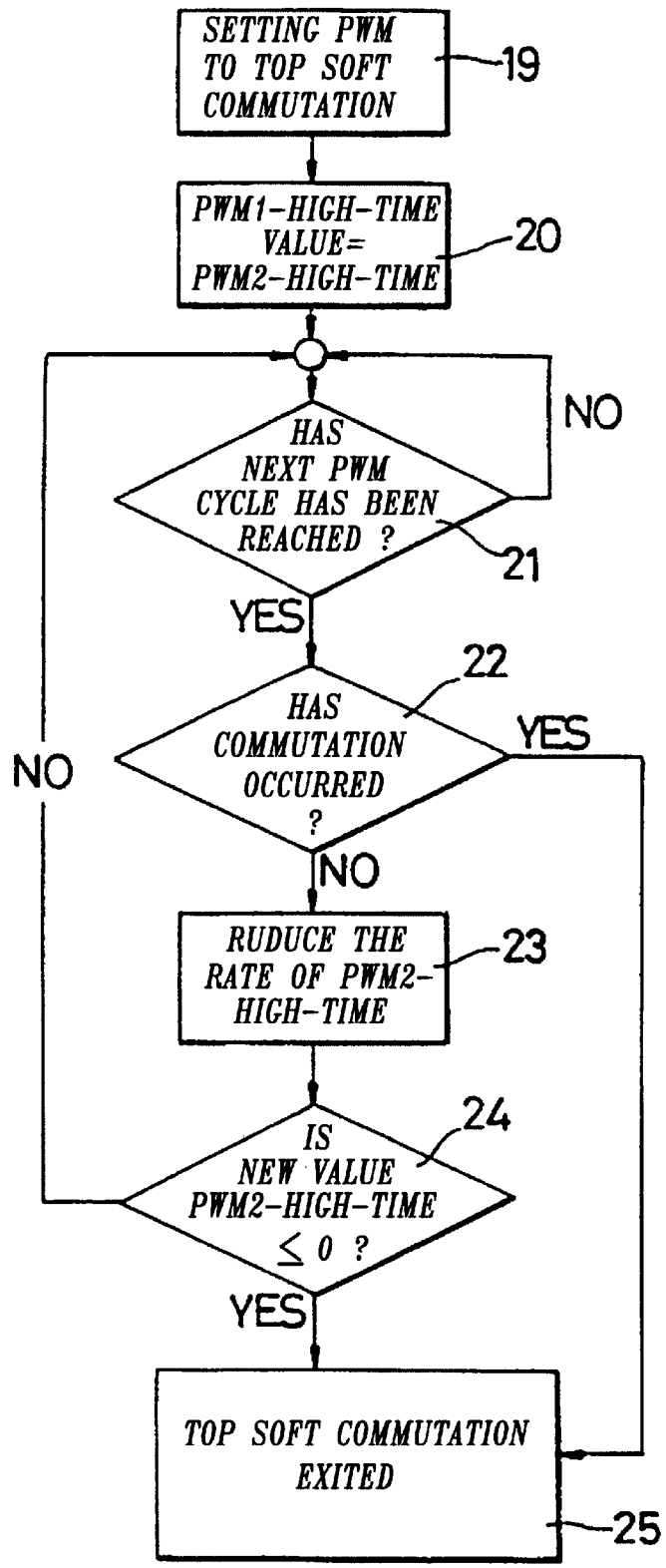
FIG. 11 shows an example of a software control routine for implementing top soft commutation strategy.

A similar modulation technique can be implemented for the top soft commutation, shown in FIGS. 10 and 11. In this case, PWM2-HIGH-TIME is initialised to the same as PWM-PERIOD on entry to this state. It is then progressively reduced to zero over a predetermined number of PWM cycles. As in the case of bottom soft commutation, the number of cycles is predetermined and exit from this state occurs when PWM2-HIGH-TIME reaches zero. The rising edge of PWM1 and the falling edge of PWM2 remain synchronised.

FIG. 11 provides an example of a top soft commutation subroutine, expressed in terms of the logical means in software terms that could be embedded within a control strategy in order to implement top soft commutation. After first setting the PWM mode to top soft commutation 19, PWM2-HIGH-TIME is initialised to the same value as PWM1-HIGH-TIME 20. The control routine then checks whether the next PWM cycle has been reached 21. If not, the routine remains in this state until the next cycle is reached, whereupon the control routine enquires whether a commutation has occurred 22. If a commutation has occurred, top soft commutation is exited 25. If no commutation has occurred, the rate of PWM2-HIGH-TIME is reduced 23 by an amount dependent upon the motor torque and the motor velocity. The control routine then checks 24 to see if the new value of PWM2-HIGH-TIME is equal to or less than zero. If yes, top soft commutation is exited, but if the new value is greater than zero, the routine returns to the state where it waits for the next PWM cycle to be reached 21.

In another refinement to the motor control strategy, high resolution absolute motor rotor position measurements can be employed to enable the control system algorithm to optimise the rotor position at which the motor current is switched from one set of phase windings to another, i.e. the position of each commutation.

Typically, the position of the rotor at which commutation occurs is determined by the position of the Hall sensors, commutation being initiated by a change in the Hall sensor output code. Because the Hall sensors are attached to the stator, these commutation positions are fixed. Under certain conditions the motor performance can be improved by physically moving the commutation positions with respect to the stator, which can help to reduce or eliminate torque discontinuities which arise at commutation. As the motor current rises, the electromagnetic field of the stator distorts the magnetic field of the rotor. This distortion effectively shifts the working angle of the phase. The distortion can be compensated by advancing the commutation point in the direction of the motor torque. The amount of advance needed depends on the magnitude of the motor current and when the motor current is negative the advance is also negative (i.e. a retardation).

FIGS. 14(*a*) and (*b*) shows how motor current variations can be minimised through the application of a current shaping technique. FIG. 14(*a*) shows the motor torque without shaping. In FIG. 14(*b*), a voltage boost signal is applied to the motor, this signal being the mirror image, or inverse, of the motor torque ripple which would occur without smoothing (i.e. torque shown in FIG. 14 (*a*)). The resultant motor current in this case is nominally free of ripple because it is the sum of the position dependent current and the applied boost signal, as shown in FIG. 14(*b*).

The commutation point can also be varied as a function of motor speed to provide higher torque at high motor speeds and thus improving the steady state torque/speed envelope of the motor for a given battery voltage.

Using high resolution absolute motor position data, the commutation point can be changed under software control. This allows the optimum commutation position to be selected for each motor operating condition.

High resolution position information can be provided by using the Hall effect switches in conjunction with an angular position measurement obtained from a torque sensor provided in the EPAS system to provide steering torque data. The operation of this absolute position measurement is described in the following paragraphs.

The angular position of the motor rotor is measured by the Hall-effect sensors. The position information has a resolution of 360°/(3×number of motor poles) e.g. 20 degrees in a 6-pole motor. Angular position data provided by the torque sensor provides information about the angular position of the worm wheel on the steering shaft. When the motor clutch is engaged, the motor is physically linked to the worm wheel through a worm and the clutch gearbox. Hence the angular position information from the torque sensor provides angular position information about the motor rotor. The angular position of the worm is known with respect to an arbitrary start position by resetting an offset to zero every time a Hall sensor changes state, and the torque sensor provides position information relative to this arbitrary position, so absolute position of the motor can be determined.

By referencing the measured angular position of the motor to the fixed angular position of a particular Hall-effect sensor transition (i.e. commutation position), it is possible to calculate an absolute motor position with high accuracy. As long as the angular position from the torque sensor is referenced to the Hall-effect sensors on every commutation, it is possible to compensate for the effect of backlash in the gear box and for torsional wind-up in the worm and wheel under conditions of high load. A suitable torque sensor for providing the angular position information required is the Lucas linear array torque sensor or the eight channel sensor.

In another embodiment it is known that certain components of the motor torque ripple are predictable, being related to the angular position of the rotor. The high resolution absolute motor position information described above can be used to determine a correction to the demanded motor current in order to compensate for this ripple component. In this manner the ripple can be mapped out.

Additionally, by observing when a commutation event is signalled by the Hall effect sensors, a velocity value obtained from the last 2 high resolution absolute motor position readings can be used to calculate a delay time. For example, if a 2° advance angle is required then the velocity measurement can be used to determine how long it will take to travel 2°. This time delay can then be clocked by the control strategy and used to trigger the commutation event after the elapsed time. This proves most effective when the commutation point is close to the Hall effect signal.

It will be understood from the above description that in one of its aspects the present invention relates to an improved motor control strategy for an electric motor suitable for use in an EPAS system, in which two modulation techniques (drive modes) are employed depending on motor conditions. In one mode, bottom-only modulation occurs, whilst in the other mode, complementary modulation occurs, the choice of drive mode being selected by a control algorithm. Several enhancements are also described to improve motor torque output. In this manner, considerable improvements over a basic control strategy are effected, resulting in an improved torque output from the motor.

The improved motor control strategy is described in the context of a power steering application. It is, however, to be understood that the control strategy is suitable for use in any application in which it is desirable to provide an improved torque output from an electric motor.

What is claimed is:

1. A method of calculating the position at a moment in time of a motor which is connected to an output shaft through an intermediate means by:

obtaining a first measurement of actual rotor position at a first instance in time using sensing means provided at the motor;

calculating speed of rotation of said output shaft using sensing means provided on said output shaft;

calculating an offset indicative of the displacement of the rotor of the motor between the first instance of time and said moment in time based upon the speed of rotation of the output shaft; and modifying the first measurement of rotor position obtained at the first instance by adding the offset to produce an output indicative of absolute motor rotor position at said moment in time.

2. A method of calculating the position of a motor according to claim 1, in which both said sensing means on the output shaft and at said motor comprise angular position sensors.

3. A method of calculating the position of a motor according to claim 1, in which said sensing means on the output shaft comprises a torque sensor which provides an output signal that is a function of angular position, and in which said sensing means at said motor comprises Hall effect sensors.

4. A method of calculating the position of a motor according to claim 1, in which said output shaft comprises a steering column in an electrically assisted steering system, and in which the intermediate means comprises a clutch and/or a gearbox and/or a worm wheel and worm.

5. A method of calculating the position of a motor according to claim 2 in which said speed of said output shaft is calculated by comparing an output from said angular position on said output shaft obtained at the said first instance in time with said output from said angular position sensor on said output shaft obtained at said moment in time.

6. A method of calculating the position of a motor according to claim 5, in which the speed of said rotor is obtained by multiplying said speed of said output shaft by the ratio of said gearbox.

* * * * *